United States Patent [19]
Matsumura et al.

[11] 3,821,173
[45] June 28, 1974

[54] PROCESS FOR PRODUCING ARTICLES OF LACTONIZED ACRYLIC POLYMERS HAVING EXCELLENT WHITENESS

[75] Inventors: Yasuo Matsumura; Kunio Maruyama, both of Okayama, Japan

[73] Assignee: Japan Exlan Company Limited, Kita-ku, Osaka, Japan

[22] Filed: Jan. 16, 1973

[21] Appl. No.: 324,245

[30] Foreign Application Priority Data
Jan. 26, 1972  Japan.................................. 47-9615

[52] U.S. Cl.................... 260/79.3 M, 260/29.1 R, 260/29.6 AB, 260/30.4 N, 260/30.8 DS, 260/32.6 N, 260/79.3 R, 260/80.75, 260/85.5 R, 260/85.5 B, 260/85.5 S, 260/88.3 L

[51] Int. Cl.......................... C08f 7/12, C08f 15/02
[58] Field of Search...... 260/85.5 B, 85.5 R, 85.5 S, 260/79.3 M, 80.75, 88.3 L

[56] References Cited
UNITED STATES PATENTS

| | | | |
|---|---|---|---|
| 2,537,881 | 1/1951 | Dickey.......................... | 260/85.5 R |
| 3,515,706 | 6/1970 | Minato et al.................. | 260/85.5 R |
| 3,717,603 | 2/1973 | Matsumura et al............ | 260/85.5 S |

*Primary Examiner*—Harry Wong, Jr.
*Attorney, Agent, or Firm*—Wenderoth, Lind & Ponack

[57] ABSTRACT

Process for lactonizing an acrylic copolymer of acrylonitrile and a monomer containing a hydroxyl group, in an acidic medium, containing nitric acid and/or nitrates by carrying out lactonization while passing chlorine gas through the acidic medium.

10 Claims, No Drawings

PROCESS FOR PRODUCING ARTICLES OF LACTONIZED ACRYLIC POLYMERS HAVING EXCELLENT WHITENESS

The present invention relates to a method for producing articles of lactonized acrylic polymers having an excellent whiteness. More particularly, in the treatment for lactonizing an acrylic copolymer containing acrylonitrile and a monomer containing a hydroxyl group and/or a monomer capable of producing a hydroxyl group, or a shaped article produced from said copolymer, in an acidic medium containing nitric acid and/or nitrates and, if necessary, a different inorganic or organic acid, the invention relates to a method for producing articles of lactonized polymers having an excellent whiteness quickly and easily, by carrying out the lactonization while passing chlorine gas through the acidic medium.

In U.S. Pat. No. 3,515,706, we have already found a method for producing lactone rings selectively in a copolymer consisting of acrylonitrile and a monomer having a hydroxyl group or a monomer capable of producing a hydroxyl group by treating the copolymer in a medium below a pH of 2 containing an acid in a concentration less than 40%.

However, in this lactonization reaction, a long period of time is required to complete the reaction and therefore there was a problem in the use of this method for an industrial method of producing lactonized acrylic polymers.

On the other hand, in the case of the lactonization using an acid such as nitric acid, the lactonization proceeds easily but the resulting lactonized polymer articles are colored, which has been a disadvantage of this method.

We have made extensive researches to develop a method of quickly and easily obtaining lactonized products having no discoloring and excellent in general use. As a result, we have found that, in the lactonization using an acidic medium containing nitric acid and/or nitrates and, if necessary, a different inorganic or organic acid, the passage of chlorine gas through the reaction medium will greatly inhibit the coloring of the articles and make only the lactonization reaction proceed selectively. The present invention has been achieved on the basis of this finding.

The main object of the present invention is to produce articles of lactonized acrylic polymers free from coloring in a quick and industrially advantageous way.

An object of the present invention is to provide a new method for lactonization wherein an acrylic copolymer consisting of acrylonitrile and a monomer having a hydroxyl group and/or a monomer capable of producing a hydroxyl group, or a shaped article produced from said copolymer, is treated in an acidic medium containing nitric acid and/or nitrates and, if necessary, a different inorganic or organic acid.

Another object of the present invention, in carrying out the lactonization in an acidic medium containing nitric acid and/or nitrates and, if necessary, a different inorganic or organic acid, is to obtain lactonized acrylic polymer articles remarkably improved in whiteness quickly by lactonizing the articles while passing chlorine gas in the acidic medium.

Further objects of the present invention will become apparent from the following concrete explanations.

These objects of the present invention, in carrying out the lactonization of an acrylic polymer containing acrylonitrile and a monomer having a hydroxyl group and/or a monomer capable of producing a hydroxyl group, or of a shaped article produced from said copolymer in an acidic medium containing nitric acid and/or nitrates and, if necessary, a different inorganic or organic acid, can be realized by lactonizing the article while passing chlorine gas through the acidic medium.

By the introduction of chlorine gas into the lactonization reaction system in accordance with the method of the present invention, the lactonized acrylic polymer articles are advantageously prevented from the coloring which is caused by nitric acid or nitrates. Furthermore, since the chlorine gas is dissolved in the acidic medium to produce hypochlorous ions ($ClO^-$), the lactonization reaction is promoted. Accordingly, the method of the present invention has made it possible to produce articles of lactonized acrylic polymer free from coloring, quickly and advantageously in an industrial way.

Also, when the lactonization reaction in accordance with the method of the present invention is carried out using concentrated nitric acid for the solvent, the chlorine gas can be removed by only keeping the spinning solution under reduced pressure after the completion of the reaction. Therefore, the spinning operation is directly possible without giving any other treatment to the spinning solution. Furthermore, while the spinning solution using concentrated nitric acid for the solvent is generally used below ordinary temperatures because of its susceptibility to coloring upon standing, the spinning solution obtained by the lactonization reaction under passage of chlorine gas in accordance with the present invention has an advantage that it is not easily colored even by heating at 50°C.

The amount of chlorine gas used in the method of the present invention varies depending on the lactonization conditions and cannot be easily determined on a definite basis. However, where the amount of passage of chlorine gas is less than 0.01 mole/hr. per kg. of the acidic medium, it is difficult to obtain a satisfactory effect for preventing coloring by the use of chlorine gas. On the other hand, from an economical viewpoint, the maximum amount of passage of chlorine gas is desirably 5 moles/hr. per kg. of the acidic medium.

Also, the maximum acid concentration in the acidic medium in the lactonization reaction in accordance with the present invention cannot be decided definitely because of its interrelation with the temperature and time of treatment. However, the desirable concentration is usually no more than 70 percent. The minimum acid concentration is not specifically limited. However, at pH above 2 the lactonization reaction becomes extremely slow and therefore such a pH range is not desirable.

The nitrates used in this invention are salts of alkali metals, alkaline earth metals and ammonium, such as potassium nitrate, sodium nitrate, calcium nitrate, ammonium nitrate, etc. The amount of these nitrates used depends on the kind of the different acid used in combination, the conditions of lactonization, etc. and it is difficult to set definite limits thereon. Thus, it is suitably determined in conformity with the desired amount of introduction of lactone units. These nitrates are used together with nitric acid or a different acid to form the acidic medium of the present invention.

Preferably, different organic or inorganic acids used as required together with nitric acid and/or nitrates are inorganic acids such as sulfuric acid, hydrochloric acid, phosphoric acid, etc.; and organic acids such as formic acid, acetic acid, oxalic acid, toluene sulfonic acid, etc. The amount of use of these acids depends on the concentration of nitric acid, the amount of use of the nitrate, the lactonization conditions, etc., and it is not easy to set definite limits thereon. Thus, it is suitably determined in accordance with the desired amount of introduction of lactone units. Anyway, it is desirable that in a mixture of nitric acid and a different acid, or in the case of an acidic medium consisting of a nitrate and a different acid, the amount of the different acid used remain within the limits of the above-mentioned acid concentrations in the acidic medium. The lactonization reaction using such concentration of acid is usually made to proceed at a treating temperature within the range of generally from $-10°$ to $200°C$, and preferably from $0°$ to $150°C$.

Also, the amount of introduction of lactone units into polymer articles can be arbitrarily decided by suitably selecting acid treating conditions, namely a treating temperature and a treating time in the above-mentioned acid concentrations. Furthermore, this acid treatment can be applied to both homogeneous and heterogeneous systems. However, in the lactonization treatment of shaped articles it is quite natural, in the light of the purport, that the treatment is made in a heterogeneous system.

In reference to the monomers having a hydroxyl group, as used in the present invention, we mean monomers copolymerizable with acrylonitrile, such as allyl alcohol, methallyl alcohol, etc.

Further, the monomer which can produce a hydroxyl group is such monomer copolymerizable with acrylonitrile and capable of producing a hydroxyl group by being decomposed under the lactonizing conditions as vinyl or allyl compounds of carboxylic acids having one to 21 carbon atoms or ethers and substituted compounds thereof with halogen atoms, hydrocarbon groups or halohydrocarbon groups having one to 20 carbon atoms. Preferable compounds are vinyl carboxylates, allyl carboxylates, vinyl hydrocarbyl or halohydrocarbyl ethers and allyl hydrocarbyl or halohydrocarbyl ethers, said hydrocarbyl or halohydrocarbyl group having one to 20 carbon atoms.

Examples of said preferred unsaturated esters of carboxylic acid having one to 21 carbon atoms are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylate, vinyl stearate, vinyl levulinate, ethylvinyl oxalate, vinyl chloroacetate, vinyl dichloroacetate, vinyl benzoate, vinyl cyclohexane-carboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, $\alpha$-methallyl acetate, $\beta$-methallyl acetate, $\gamma$-methallyl acetate, methallyl propionate, methylmethally oxalate, $\gamma$-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl ether, $\beta$-chlorovinyl methyl ether, $\beta$-bromovinyl methyl ether, vinyl ethyl ether, isopropenyl ethyl ether, $\beta$-chlorovinyl ethyl ether, $\beta$-bromovinyl ethyl ether, vinyl 2-chloroethyl ether, vinyl trifluoroethyl ether, vinyl propyl ether, vinyl isopropyl ether, $\beta$-chlorovinyl isopropyl ether, vinyl butyl ether, $\beta$-chlorovinyl butyl ether, vinyl isobutyl ether, $\beta$-chlorovinyl isobutyl ether, $\beta$-bromovinyl isobutyl ether, vinyl tert-butyl ether, vinyl neopentyl ether, vinyl n-hexyl ether, vinyl 2-ethylhexyl ether, vinyl octyl ether, vinyl cyclohexyl ether, vinyl phenyl ether, $\alpha$-chlorovinyl phenyl ether, vinyl p-methylphenyl ether, vinyl p-chlorophenyl ether, $\alpha$-bromovinyl phenyl ether, vinyl 2-chlorophenyl ether, vinyl 2,4-dichlorophenyl ether, vinyl 2,3,4-trichlorophenyl ether, vinyl $\alpha$-naphthyl ether, vinyl benzyl ether, vinyl p-chlorobenzyl ether, vinyl $\alpha,\alpha$-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tertbutyl ether, allyl octyl ether, allyl phenyl ether, allyl p-chlorophenyl ether, allyl 2-chlorophenyl ether, allyl 2,4-dichlorophenyl ether, allyl $\alpha$-naphthyl ether, allyl benzyl ether, methallyl methyl ether, metallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used.

Acrylic copolymers containing such monomers, as combined, having a hydroxyl group and/or monomers capable of producing a hydroxyl group can be obtained by the well-known suspension polymerization method, emulsion polymerization method, or solution polymerization method.

The ratio of the acrylonitrile copolymer components of the present invention, namely the ratio of acrylonitrile, the monomer having a hydroxyl group and/or the monomer capable of producing a hydroxyl group and the different unsaturated monomer suitably introduced as required, is suitably decided in conformity with the amount of lactone units contained in the resulting lactonized polymer or the amount of introduction of the above-mentioned unsaturated monomer. Thus, it is difficult to determine the ratio definitely. However, it is preferable for the ratio to contain more than 50 mole percent of acrylonitrile. Alternatively, it is allowable to use an acrylonitrile copolymer containing less than 50 mole percent of acrylonitrile and, as the remainder, the monomer having a hydroxyl group and/or the monomer capable of producing a hydroxyl group and the different unsaturated monomer suitably introduced as required.

Further the acrylic copolymers to be used in this invention may contain other monomers copolymerizable with acrylonitrile within a limit not obstructing the lactonization of this invention. Examples of such monomers are allylsulfonic acid and methallyl sulfonic acid and their salts, styrene, vinyl chloride, vinyl bromide and vinylidene chloride.

Furthermore, it is also allowable to replace a part of the acrylonitrile composing the acrylonitrile copolymer with an amount of acrylic acid or an unsaturated monomer capable of producing a carboxyl group, such as methyl acrylate, ethyl acrylate, methyl methacrylate, acrylamide, methacrylamide, etc. so far as the amount of replacement exerts no remarkable adverse influence on the resulting lactonized polymer, so that the carboxylic groups produced by the lactonization reaction of the present invention could be utilized for the formation of lactone rings.

Such acrylic copolymers, or shaped products such as fibers or films produced from the copolymers are treated in the acidic medium of the present invention to form five or six membered lactone units having the following structure:

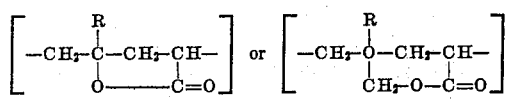

wherein R is hydrogen or a methyl group, in the main chain of the copolymer.

The acrylic copolymers having these lactone ring structures obtained by treating them in the form of polymer are soluble in the generally known solvents for polyacrylonitrile, for example organic solvents such as dimethyl sulfoxide, dimethylformamide, dimethylacetamide, γ-butyrolactone, ethylene carbonate, etc.; inorganic solvents such as nitric acid, aqueous concentrated zinc chloride solution, aqueous concentrated sodium rhodanide solution, etc., and are formed into shaped articles such as fibers, films, etc. by the well-known dry-, wet-, or semi-melt- spinning or film-forming method.

The formation of lactone units in the main chain of the polymer molecules forming the polymeric articles, as in the present invention, restricts the movement, namely the degree of freedom, of the molecular chain. Accordingly, the shaped articles such as fibers or films produced from the copolymers having such ring structures, or those articles having such ring structures introduced by the lactonization treatment of the present invention, are greater in strength and Young's modulus, and particularly much more improved in the liability to extension in hot water which is one of the defects of the acrylic fiber, when compared with the articles produced from the usual copolymers having no ring structures, namely those articles which have not undergone the lactonization treatment with acid.

The following examples are given only for detailed explanation of the present invention and not for limiting the scope of the invention. The percentages and parts in the examples are by weight unless otherwise indicated.

The lactone units in the following examples are shown by weight percentage of the group

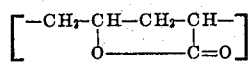

in the polymer.

The analysis of the content of the lactone units was carried out in accordance to the method described in the "Chemistry of High Polymers" ("Kobunshi Kagaku" in Japanese), vol. 7, pp. 142–154 (1950). Namely, the content was determined from the infrared absorption band at 1176 cm$^{-1}$ of the copolymer to be tested, using, as a standard, a copolymer having a known amount of lacetone units, synthetized from a copolymer of methyl acrylate and vinyl acetate.

For the determination of the degree of coloring of the copolymer, the resulting lactonized polymer was pressed into tablets and then the reflectances at 453 mμ, 553 mμ, and 595 mμ were obtained from the reflection curve of visible rays of the test sample tablet to magnesium oxide. The degree of coloring was calculated from the following formula:

Degree of coloring = Reflectance at 595 mμ — Reflectance at 453 mμ/Reflectance at 553 mμ × 100

The larger this value is, the larger the degree of coloring is.

EXAMPLE 1

Ten parts of an acrylonitrile copolymer consisting of 79.5 percent acrylonitrile, 20 percent vinyl acetate, and 0.5 percent methallylsulfonic acid was added to 90 parts of a 15 percent aqueous solution of nitric acid. The aqueous nitric acid solution was boiled for 1 hour under stirring while passing chlorine gas through the solution in an amount of 0.05 mole/hr., 0.2 mole/hr., or 1 mole/hr. per kg. of the solution. After the lactonized copolymer thus obtained was washed with water and dried, the content of lactone units and the degree of coloring were measured, which results are shown in Table 1.

Table 1

| Amount of chlorine gas passed per kg. of 15% nitric acid solution | Content of lactone units (%) | Degree of coloring |
| --- | --- | --- |
| 0.05 mole/hr. | 18.0 | 8.5 |
| 0.2 mole/hr. | 18.0 | 4.5 |
| 1 mole/hr. | 18.8 | 3.5 |
| No passing | 17.8 | 17.0 |

As apparent from the results in Table 1, it was confirmed that the passing of chlorine gas through the reaction system resulted in a lactonised polymer remarkably improved in whiteness.

EXAMPLE 2

1.6 kg. of a copolymer consisting of 89 percent acrylonitrile and 11 percent vinyl acetate was dispersed in 8 kg. of a 15 percent nitric acid solution. The dispersion was subjectd to lactonization reaction under boiling for 1.5 hours with stirring while passing chlorine gas in an amount of 1.5 moles/hr. After completion of the reaction, the resulting product was washed with water and dried to produce a lactonized copolymer of a lactone unit content of 10.5 percent and having an improved whiteness in degree of coloring of 3.2. In contrast thereto, the lactonized copolymer obtained by treating in the same way but without passing chlorine gas, had a degree of coloring of 18.5 and was considerably colored.

Eleven parts of the thus-obtained lactonized copolymer was dissolved in 89 parts of an aqueous 45 percent sodium rhodanide solution to prepare a spinning solution. The spinning solution was spun into an aqueous 12 percent sodium rhodanide solution at −3°C through a spinneret having 1000 orifices, each 0.09 mm in diameter. After coagulation, the resulting fiber was stretched twice the initial length in the coagulaton bath, and further stretched 6 times in boiling water.

The fiber thus obtained was dried in hot current of air and relaxed in pressurized steam at 140°C, and thereafter dried again to produce a fiber composed of 3 denier single filaments. For comparison, the same copolymer but not lactonized was spun in the same way. However, the relaxing treatment was carried out at 115°C because of excessive shrinking.

The properties of the two kinds of fibers thus obtained are shown in Table 2.

Table 2

|  | Strength at breakage (g/d) | Elongation at breakage (%) | Young's modulus at 20°C (g/d) | Young's modulus in water at 95°C (g/d) | Elongation at breakage in water at 95°C (%) |
|---|---|---|---|---|---|
| Fiber of the present invention (lactonized) | 4.2 | 32 | 60 | 1.2 | 85 |
| Conventional fiber (non-lactonized) | 3.3 | 45 | 43 | 0.5 | 180 |

As mentioned in Table 2, the fiber produced from the lactonized acrylic polymer of the present invention was confirmed to be of high commodity value because of its high strength and Young's moduli, and the remarkable improvement in the liability to extension in hot water.

EXAMPLE 3

Ten parts of an acrylic copolymer consisting of 79 percent acrylonitrile, 20 percent vinyl acetate and 0.5 percent methallylsulfonic acid was added to 100 parts of the various acidic media shown in Table 3. The copolymer in each acidic medium was lactonized at the boil or at 80°C for one hour under stirring. The polymer thus obtained was washed with water and dried, and then measured for the content of lactone units and the degree of coloring. The results are shown in Table 3.

As apparent from the results in Table 3, when chlorine gas was passed through the lactonization reaction system in accordance with the method of the present invention, the resulting lactonized polymer was remarkably improved in whiteness and had an increased amount of produced lactone units.

EXAMPLE 4

Fifteen parts of the same copolymer as in Example 3 was dissolved in 85 parts of 60 percent nitric acid so as to form a homogeneous solution. Then, the copolymer was lactonized at 40°C for 5 hours under stirring while passing chlorine gas through the solution in an amount of 0.2 mole/hr. per kg. of the solution. Thereafter, the solution was poured into a large amount of water to precipitate the resulting lactonized acrylic polymer, which was then washed with water and dried. The polymer was measured for the content of lactone units and the degree of coloring, which results are shown in Table 4.

TABLE 4

|  | Composition of the acidic medium | Content of lactone units (%) | Degree of coloring |
|---|---|---|---|
| Comparative example | 60% nitric acid | 17.2 | above 25 |
| Present invention | 60% nitric acid + 0.2 mole/hr. chlorine gas | 17.8 | 6.5 |

Table 3

| one hour | Composition of the acidic medium (aqueous solution) | Treatment at the boil (106°C) for | | Treatment at 80°C for 2 hr. | |
|---|---|---|---|---|---|
|  |  | Content of lactone units (%) | Degree of coloring | Content of lactone units (%) | Degree of coloring |
| Comparative examples | 20% sulfuric acid | 6.5 | — | — | — |
|  | 20% sulfuric acid + 10% sodium nitrate | 16.0 | above 25 | — | — |
|  | 20% sulfuric acid + 10% sodium nitrate + 0.5 mole/hr. chlorine gas | 17.5 | 4.0 | — | — |
| Present invention | 20% sulfuric acid + 10% sodium nitrate + 1 mole/hr. chlorine gas | 19.5 | 3.7 | — | — |
| Comparative example | 30% nitric acid | — | — | 16.6 | above 25 |
| Present invention | 30% nitric acid + 0.5 mole/hr. chlorine gas | — | — | 17.6 | 5.0 |

What is claimed is:

1. In a process for producing a lactonized product by treating an acrylic copolymer containing at least 50 mol percent of acrylonitrile and at least one monomer selected from the group consisting of vinyl type monomers having a hydroxyl group and vinyl type monomers capable of forming a hydroxyl group, or an article shaped from such copolymer, with an acid medium, the improvement wherein the acid medium has a pH not higher than 2 and contains not greater than 70 percent concentration of (1) nitric acid, (2) a mixture of nitric acid and at least one other acid selected from the group consisting of sulfuric, hydrochloric, phosphoric, formic, acetic, oxalic and toluene sulfonic acids or (3) a mixture of at least one acid selected from the group consisting of nitric, sulfuric, hydrochloric, phosphoric, formic, acetic, oxalic and toluene sulfonic acids and at least one nitrate selected from the group consisting of alkali metal, alkaline earth metal and ammonium nitrates, and the lactonization is carried out while passing chlorine gas through the acid medium in an amount of from 0.01 to 5 moles/hr. per kg. of the acid medium.

2. The improvement according to claim 1, wherein said acid medium contains no more than 70 percent by weight of nitric acid or of the mixture of nitric acid and at least one other acid.

3. The improvement according to claim 1, wherein said acid medium contains no more than 70 percent by weight of the mixture of at least one nitrate and at least one acid.

4. The improvement according to claim 3, wherein said nitrate is selected from the group consisting of potassium nitrate, calcium nitrate and ammonium nitrate.

5. The improvement according to claim 1, wherein said lactonization reaction is carried out at a temperature of −10°C to 200°C.

6. The improvement according to claim 1, wherein the monomer having a hydroxyl group is allyl alcohol or methallyl alcohol.

7. The improvement according to claim 1, wherein the monomer capable of forming a hydroxyl group is selected from the group consisting of vinyl and allyl compounds of carboxylic acids of 1–21 carbon atoms and ethers, and said compounds substituted with halogen atoms or hydrocarbon or halohydrocarbon groups of 1–20 carbon atoms.

8. The improvement according to claim 1, wherein the monomer capable of forming a hydroxyl group is a vinyl ester of a fatty acid.

9. The improvement according to claim 8, wherein the vinyl ester is vinyl acetate or vinyl propionate.

10. The improvement according to claim 1, wherein the copolymer consists essentially of (1) at least 50 mol percent of acrylonitrile, (2) at least one monomer selected from the group consisting of vinyl type monomers having a hydroxyl group and vinyl type monomers capable of forming a hydroxyl group and (3) at least one monomer selected from the group consisting of allyl sulfonic acid, methallyl sulfonic acid, their salts, styrene, vinyl chloride, vinyl bromide and vinylidene chloride.

* * * * *